Feb. 28, 1928.                                                                    1,660,746
J. T. DYE
MOTOR TRAFFIC SIGNAL
Filed Sept. 14, 1922                     2 Sheets-Sheet 1
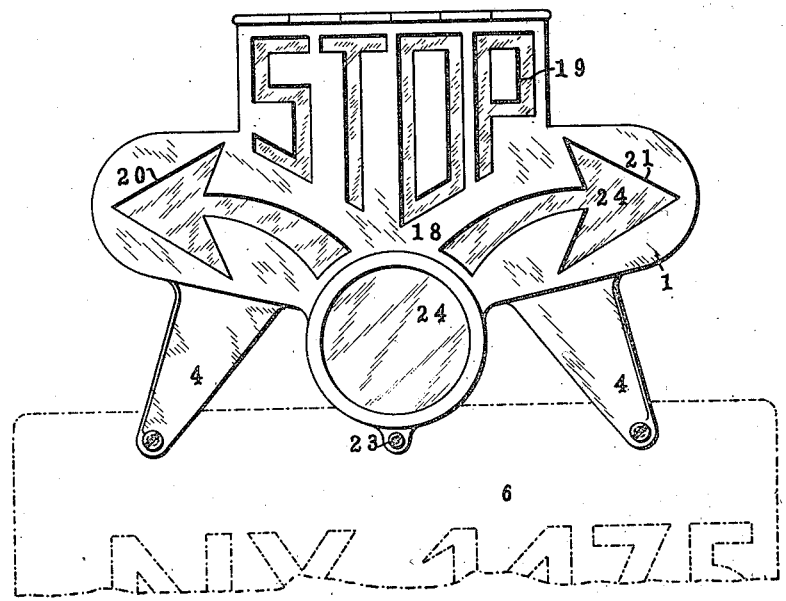
Fig.1
Fig.2
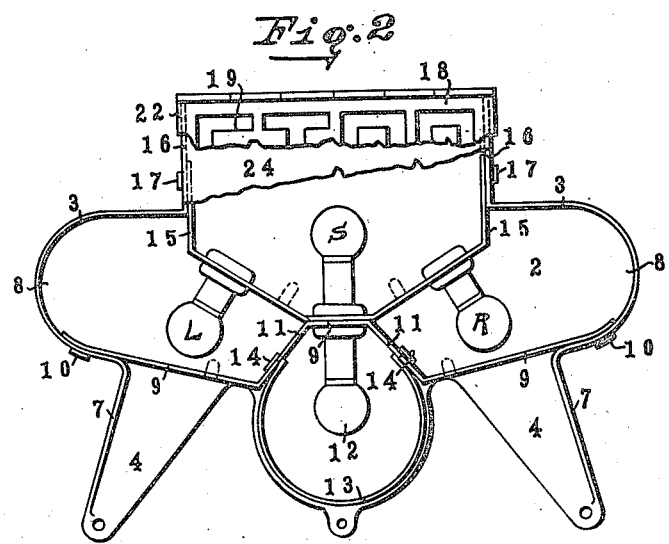
INVENTOR
James T. Dye
BY
Dull, Worfield & Dull
ATTORNEY Feb. 28, 1928.
J. T. DYE
1,660,746
MOTOR TRAFFIC SIGNAL
Filed Sept. 14, 1922
2 Sheets-Sheet 2
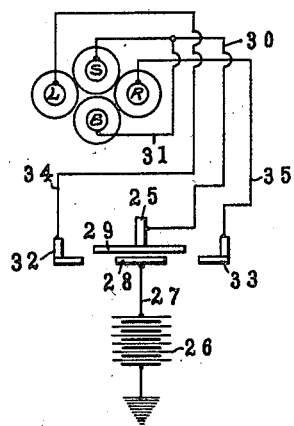
*Fig.7*
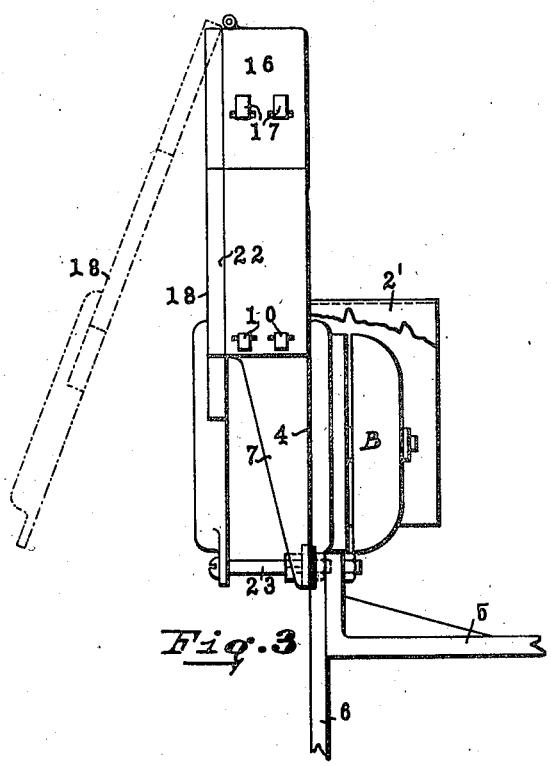
*Fig.3*
*Fig.4*
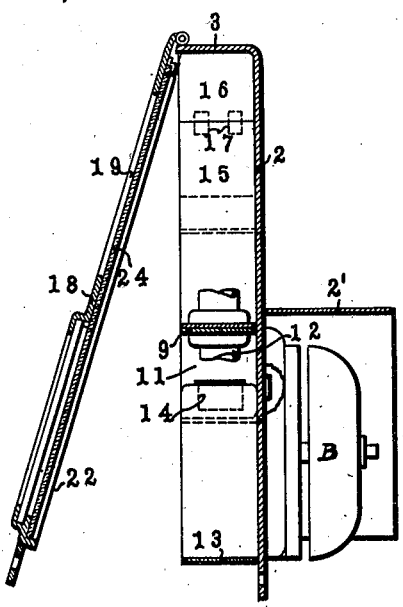
*Fig.5*
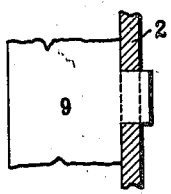
*Fig.6*
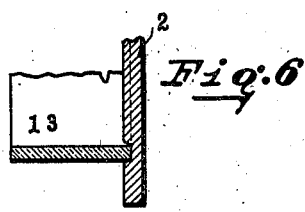
INVENTOR
James T. Dye
BY
Drull, Warfield & Drull
ATTORNEY Patented Feb. 28, 1928.

1,660,746

UNITED STATES PATENT OFFICE.

JAMES T. DYE, OF NEW YORK, N. Y., ASSIGNOR, BY MESNE ASSIGNMENTS, TO E. C. TAYLOR MFG. CORPORATION, OF NEW YORK, N. Y., A CORPORATION OF NEW YORK.

MOTOR-TRAFFIC SIGNAL.

Application filed September 14, 1922. Serial No. 588,140.

This invention relates to a signal apparatus and more particularly in some of its details to an electrically controlled signal, especially adapted for traffic control in connection with automobiles.

The general object of the invention is the provision of an improved signal of the class mentioned which is simple in design, efficient in use, comparatively inexpensive in manufacturing costs, and susceptible of ready installation and repair.

A further object is the provision of an improved signal of the class mentioned for attachment to an automobile or similar vehicle for selectively displaying traffic directory or warning signals to indicate whether the vehicle intends slowing down, turning to the right or left, etc.

A further object of the invention is the provision of an improved vehicle signal for displaying a stop signal and subsequently displaying a direction signal while the stop signal is being displayed.

The invention accordingly consists in the features of construction, combinations of elements and arrangement of parts which will be exemplified in the construction hereinafter set forth, and the scope of the application of which will be indicated in the following claims.

In the accompanying drawings forming a part of this specification and in which an illustrative but preferred embodiment of the invention is disclosed.

Fig. 1 is an elevation of the signal;

Fig. 2 is an elevation with the cover partially removed showing the interior of the casing;

Fig. 3 is a side elevation;

Fig. 4 is a central transverse vertical section through the casing;

Figs. 5 and 6 are details showing the connection of the parts and

Fig. 7 is a wiring diagram.

Referring now to the drawing for a detailed description of the embodiment there shown, the casing 1 for the signal is shown as having a base plate 2 of strong material, such as metal, and having an angularly marginal flange 3 extending partially therearound and forming top and side walls for the casing. Struck off integrally with the base plate are supporting legs or standards 4 for supporting the signal to a bracket 5 of an automobile or similar vehicle, a license tag being normally disposed as shown at 6. The marginal flange 3 is extended as shown at 7 along the margin of the standards to form stiffening and rigidifying flanges.

The base is provided with laterally projecting sections 8 along the outer edges of which the flange 3 is continued, and a bottom plate 9 is attached at its extremities to these flange continuations, extending along the lower edge of the base plate to provide a bottom wall for the casing. As shown, this bottom wall is secured to said flange by lugs 10 struck off from the plane of the plates and adapted to extend through apertures in the flanges and to be bent over to lie flat against the surface. The plate 9 is formed intermediate its ends with an upwardly offset portion 11 with opposed converging sections, forming the top wall of a lower compartment for a rear signal or tail lamp 12. This compartment lies intermediate the supporting standards 4, the back wall thereof being provided by an extension of the base plate 2. The side and bottom walls of the tail light compartment are formed by an arcuate plate 13 of translucent material, such as celluloid or mica, so light rays from the tail lamp may illuminate the license tag. It is obvious, however, that the walls of the tail light compartment may be of metal with transparent windows. The plate 13 is preferably seated at its inner edge in a groove formed in the base plate 2 so as to form a tight joint, as shown in Fig. 6, and the ends are provided with lugs 14 anchored in openings in the converging wall sections of the intermediate offset portion 11 of the wall 9.

A metal partition 15 is secured at its vertically disposed extremities to vertical sections 16 of the marginal wall flange 3 by means of lugs 17 anchored in the latter. These vertical extremities extend downwardly a short distance to form extensions of the vertical walls 16, and the intermediate portions of the partition 15 converge downwardly to meet the upwardly offset section of the bottom plate or wall 9, being preferably secured thereto. This partition divides the interior of the casing into a plurality of illuminating compartments. Two of these compartments are laterally disposed in the casing, being similar in shape and size and symmetrically arranged, while the third compartment is relatively centrally disposed and superposed with respect to the lateral compartments. Signal lamps are disposed in the several illuminating compartments, being mounted on suitable bases carried by partition 15, as shown.

Overlying these illuminating compartments and the tail light compartment, is face plate 18 of metal or other strong opaque material, hinged to the top of the base section. The zone of this face plate overlying the centrally disposed compartment is formed with openings therethrough providing signal characters or indicia 19 such as the word "Stop", while the zones overlying the lateral compartments are similarly formed with characters, such as arrows 20 and 21, pointing to the right and to the left respectively. It will be noted that these illuminating compartments and the signal characters are arranged in compact relationship with respect to each other so the complete signal unit may be constructed of relatively small dimensions occupying little installation space and at the same time providing large conspicuous display characters. The cover plate is preferably provided with marginal flanges 22 enclosing the outer edges of the side walls so as to make a tight and water proof joint and a fastening device 23 is employed to hold the cover plate in operative position. The hinging of this plate permits outwardly swinging of the same, as indicated by the dot and dash lines in Fig. 3, facilitating repair and replacement of parts.

Underlying the cover plate and preferably secured thereto by any improved means, and overlying the illuminating compartments and the tail light compartment, is a sheet of translucent material 24 preferably colored red so as to display red direction signal characters and a red tail light.

An electric bell B or similar audible signal is preferably mounted on the rear of the base plate 2 immediately behind the tail light compartment, and a housing 2' may be provided therefor to exclude dirt and moisture.

In Fig. 7 a diagrammatic representation of a controlling means for the signal above described, including a switch 25, is shown. The battery 26 is connected by a conductor 27 with a stationary contact plate 28 of the switch, while a movable contact plate 29 thereof is connected by a conductor 30 with one terminal of the lamp S mounted in the centrally disposed illuminating compartment and by a conductor 31 with one terminal of the bell B. Stationary contacts 32 and 33 are connected, respectively, by conductors 34 and 35 with signal lamps L and R mounted in the laterally disposed illuminating compartments. The contact 29 is movable to engage contact plate 28, and also is movable laterally to right or left in Fig. 7 to engage either of the contacts 32 or 33. The movable contact plate 29 is arranged to simultaneously engage the stationary contact plate 28 and either of the fixed contacts 32 or 33. By this arrangement it will be seen that the lamp S may be energized alone to display the "Stop" signal, while the bell is simultaneously sounded, and that by moving the contact 29 to the left the lamp L is energized to display a left turn signal in sequence with the display of the "Stop" signal, both "Stop" and left turn being displayed while the bell continues to sound and the stop signal may continue to be displayed. A similar result is obtained with respect to the right turn signal by moving the contact 29 to engage the contact 33.

This arrangement provides a conspicuous signal readily observed from the rear so as to warn following vehicles of intended turning to right or left or slowing down. Also the preliminary display of the "Stop" signal gives a preliminary warning to the occupants of following vehicles, notifying them of the slowing down which usually precedes a turn to the right or to the left. The subsequent display of the direction signal gives a conspicuous notification of the intention to turn, attention to the direction signal being accentuated or promoted by the preliminary stop signal.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention what I claim as new and desire to secure by Letters Patent, is:

1. In a signal device, in combination, a casing, a base plate for said casing having an angularly disposed flange forming a peripheral wall for the casing, supporting standards outstanding from said base plate being integral with said plate adapted for attachment to a bracket for supporting the signal, said flange being extended along the outer edges of said standards to provide reinforcing flanges therefor, a bottom plate attached at its extremities to said first mentioned flange and cooperating therewith to complete the peripheral wall of the casing and having an upwardly offset part intermediate its ends, and an interior partition having upwardly extending ends attached to the upper part of said peripheral wall and having an intermediate part with downwardly converging sections contacting with and secured to said upwardly offset part of said bottom plate said interior partition thus cooperating to divide the interior of the casing into a plurality of illuminating compartments and to provide an interior reinforcement for the casing.

2. In a signal device, in combination, a casing, a base plate for said casing having an angularly disposed flange forming a peripheral wall for the casing, supporting standards outstanding from said base plate being integral with said plate and adapted for attachment to a bracket for supporting the signal, said flange being extended along the outer edges of said standards to provide reinforcing flanges therefor, a bottom plate attached at its extremities to said first mentioned flange and cooperating therewith to complete the peripheral wall of the casing and having an upwardly offset part intermediate its ends, and an interior partition having upwardly extending ends attached to the upper part of said peripheral wall and having an intermediate part with downwardly converging sections contacting with and secured to said upwardly offset part of said bottom plate, said interior partition thus cooperating to divide the interior of the casing into a plurality of illuminating compartments and to provide an interior reinforcement for the casing, and a cover plate hinged to said casing and overlying said compartments and having different signal characters cut therethrough and respectively overlying said illuminating compartments for display when the corresponding compartment is illuminated, and a translucent medium disposed between said cover plate and said compartment and overlying said signal characters.

3. In a signal device, in combination, a casing, a base plate for said casing having an angularly disposed flange forming a peripheral wall for the casing, a bottom plate attached at its extremities to said flange and cooperating therewith to complete the peripheral wall of the casing, said bottom plate being offset upwardly intermediate its ends to provide a recess for mounting a tail lamp, an interior partition attached at its ends to said flange and having downwardly converging portions attached at their lower parts to the offset part of said bottom plate and dividing the interior space into a plurality of illuminating compartments, a translucent window below said tail lamp recess for completing the tail light compartment, and lamp supports carried by the converging portions of said partition and at the connection thereof with said bottom plate.

4. In a signal device, in combination, a casing, a base plate for said casing having an angularly disposed flange forming a peripheral wall for the casing, supporting standards outstanding from said base plate being integral with said plate and adapted for attachment to a bracket for supporting the signal, said flange being extended along the outer edges of said standards to provide reinforcing flanges therefor, a bottom plate attached at its extremities to said first mentioned flange and cooperating therewith to complete the peripheral wall of the casing and having an upwardly offset part intermediate its ends, and an interior partition having upwardly extending ends attached to the upper part of said peripheral wall and having an intermediate part with downwardly converging sections contacting with and secured to said upwardly offset part of said bottom plate, said interior partition thus cooperating to divide the interior of the casing into a plurality of illuminating compartments and to provide an interior reinforcement for the casing, said base plate having a downward extension intermediate said standards to provide a back wall for a tail light compartment, the upper wall of which is provided by the upwardly offset part of said bottom plate, and a lower wall for said tail light compartment supported at its upper ends upon said bottom plate.

In testimony whereof I affix my signature.

JAMES T. DYE.